United States Patent [19]

Hayashi et al.

[11] Patent Number: 4,942,640
[45] Date of Patent: Jul. 24, 1990

[54] AUTOMATIC ELECTRIC VACUUM CLEANER WITH TEMPORARY MANUAL OVERRIDE

[75] Inventors: Nobuhiro Hayashi, Shiga; Toshiichiro Tanaka, Youkaichi; Seiji Yamaguchi, Shiga; Hidetoshi Imai, Youkaichi, all of Japan

[73] Assignee: Matsushita Electric Industrial Co., Ltd., Osaka, Japan

[21] Appl. No.: 283,324

[22] PCT Filed: Apr. 1, 1988

[86] PCT No.: PCT/JP88/00337

§ 371 Date: Dec. 1, 1988

§ 102(e) Date: Dec. 1, 1988

[87] PCT Pub. No.: WO88/07347

PCT Pub. Date: Oct. 6, 1988

[30] Foreign Application Priority Data

Apr. 2, 1987 [JP] Japan ................................ 62-81441

[51] Int. Cl.⁵ ............................................... A47L 9/28
[52] U.S. Cl. .......................................... 15/319; 15/339; 15/412
[58] Field of Search .......................... 15/319, 339, 412

[56] References Cited

U.S. PATENT DOCUMENTS

| 4,601,082 | 7/1986 | Kurz | 15/319 |
| 4,654,924 | 4/1987 | Getz et al. | 15/339 X |
| 4,680,827 | 7/1987 | Hummel | 15/319 |

FOREIGN PATENT DOCUMENTS

| 0178335 | 4/1986 | European Pat. Off. | |
| 2910832 | 9/1979 | Fed. Rep. of Germany | 15/319 |
| 3431164 | 8/1985 | Fed. Rep. of Germany | 15/339 |
| 2016910 | 9/1979 | United Kingdom | |

*Primary Examiner*—Chris K. Moore
*Attorney, Agent, or Firm*—Lowe, Price, LeBlanc, Becker & Shur

[57] ABSTRACT

An electric vacuum cleaner is disclosed, wherein input power for a motor blower contained in the body of the same can be controlled by switches (6), (7) provided to the handle of a hose. Input power for motor blower is automatically controlled in accordance with the amount of dust passing through suction air path. A switch (22) is provided which is capable of changing suction force temporarily in automatic operation mode by operation of the user, irrespective of the amount of dust.

14 Claims, 1 Drawing Sheet

AUTOMATIC ELECTRIC VACUUM CLEANER WITH TEMPORARY MANUAL OVERRIDE

FIELD OF THE INVENTION

The present invention relates to a home electric vacuum cleaner which is capable of controlling input power for a motor blower contained in the body of the electric vacuum cleaner by a switch provided in the handle portion of a hose.

BACKGROUND OF THE INVENTION

For example, in U.S. Pat. No. 460,082, there is disclosed an electric vacuum cleaner which is capable of controlling rotational speed of an electric motor for a suction fan in accordance with an indication of a detected amount of dust under suction wherein an indication of the amount of dust is provided to an operator. However, in the above nmentioned prior art in such a controlling mode, i.e., in an automatic operation mode, it is impossible to temporarily control suction force manually, without regard to the detection signal. Therefore, there is an inconvenience to a user in actual use of the prior art device.

Additionally, in Japanese patent application provisional publication No. 59-14594, an electric vacuum cleaner is disclosed which is capable of controlling suction force by a handle switch provided to a handle of the electric vacuum cleaner having a motor for a suction fan and an AC motor of floor-suction-inlet electric drive. However, the disclosed electric vacuum cleaner has a drawback in that when the handle switch is operated, input power for the motor blower changes gradually, thus, decreasing rotational frequency of the AC motor of the floor-suction-inlet electric drive. Therefore, this fact means that such handle switch operation does not provide an easily sensed response to operation of the handle switch, but gives the operator only a strange feeling.

DISCLOSURE OF THE INVENTION

The object of the present invention is to provide an electric vacuum cleaner having an automatic operation function and being capable of changing a suction force of a motor blower in accordance with a detection signal which is obtained by detecting the amount of dust passing through the hose, but which is also capable of temporarily changing the suction force as desired by an operator, even if the electric vacuum cleaner is set in an automatic operation mode.

In order to achieve this object, according to the present invention there is provided an electric vacuum cleaner which is capable of an automatic control operation for changing suction force automatically in accordance with the amount of dust passing through the air suction path, wherein a switch is provided which is capable of temporarily changing the suction force manually, irrespective of the amount of dust detected in the above-mentioned automatic controlling operation.

In an electric vacuum cleaner according to the above mentioned structure, when the operator operates the above-mentioned switch, the operator can change suction force temporarily as desired. This means that if the operator uses the the electric vacuum cleaner where this electric vacuum cleaner would operate with a low suction force in automatic operation mode, and if the operator desires to operate the electric vacuum cleaner at a high suction force locally, the operator can operate the electric vacuum cleaner with a high suction force with a switch operation. When the operator terminates the switch operation, the electric vacuum cleaner returns to the original automatic operation after passage of a predetermined time period. Contrarily, if the operator believes that the suction force is too high, the operator can similarly change the suction force to a low suction force rapidly with easy operation. In addition, the electric cleaner can be returned to the original state after a predetermined time period passed.

Moreover, according to the present invention, there is provided an electric vacuum cleaner having indication elements for indicating the degree of suction force in the automatic control mode and means for causing the above mentioned indication elements to indicate changes in levels of suction force which result from operating the switch. According to this structure, switch operation and automatic operation states are signalled to the operator to enable simplified evaluation by the operator, so that there is provided a very useful electric vacuum cleaner because when the user operates the switch in the suction force incremental or decremental direction, the vacuum cleaner informs the operator of the direction of switch operation by a flickering light emitting element (LED), in a similar manner to the indications provided to the operator during the automatic control operation mode.

PREFERRED EMBODIMENT OF THE INVENTION

Figure 1:
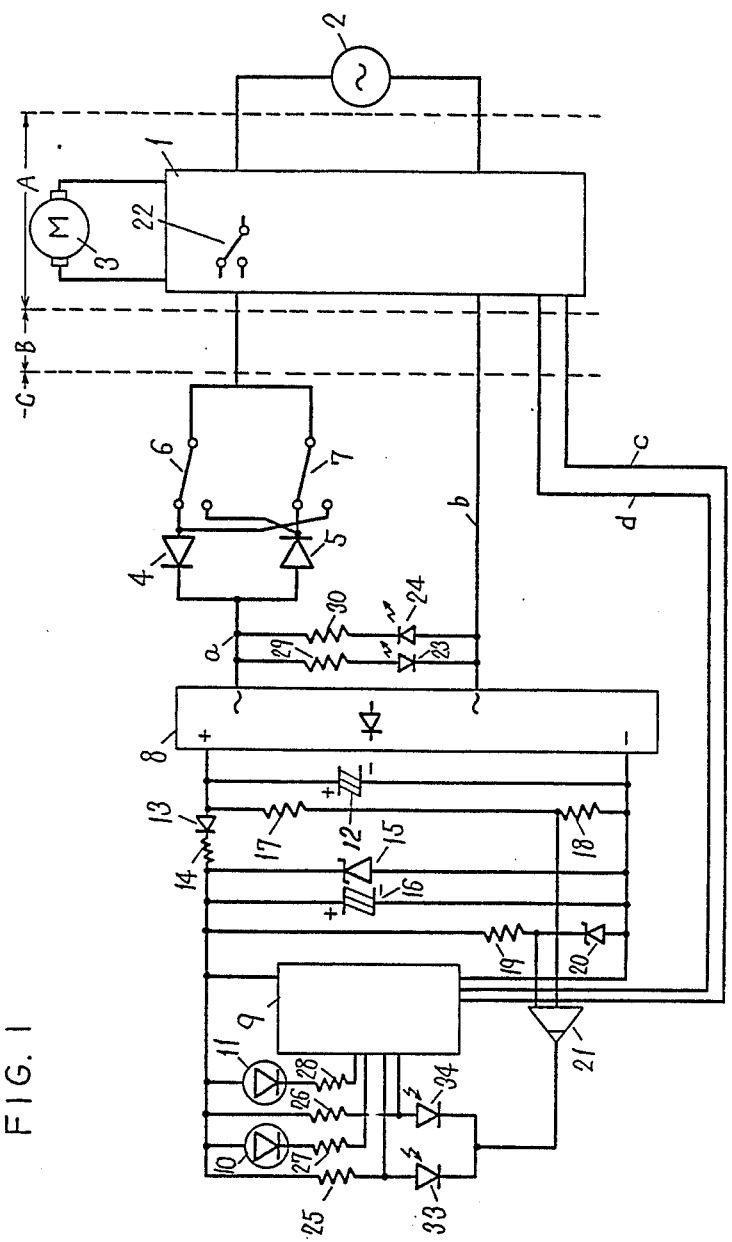
FIG. 1 is a schematic circuit diagram showing an embodiment of the present invention of the electric vacuum cleaner.

In FIG. 1, a control circuit 1 controls a motor blower 3 which is contained in the body A, i.e., a housing of an electric vacuum cleaner, and is connected to a power supply 2. A circuit having diodes 4, 5, UP-switch 6, and DOWN-switch 7 is interposed in the middle of one of the two conductors "a" and "b" which are passed through a suction hose B of the electric vacuum cleaner, at the handle portion C of the hose. In the circuit, diodes 4, 5 are connected in inverse parallel to each other and the UP-switch 6 and the DOWN-switch 7 are connected to diodes 4, 5 in series respectively. The conductors "a", "b" supply power through a diode bridge 8 to a dust detection circuit 9 for detecting for dust passing through the hose per unit time. That is, the power source circuit of the dust detection circuit 9 is a regulated DC voltage power source comprising a diode bridge 8 for full-wave rectifying AC current applied to the above-mentioned two conductors "a", "b", a capacitor 12 for smoothing the rectified current, a zener diode 15 and a capacitor 16, and a diode 13 and resistor 14 for transferring smoothed current to the zener diode 15 and the capacitor 16. A comparator 21 compares a potential which is obtained by dividing a potential from non-regulated DC voltage power supply portion by resistors 17, 18 with a reference potential obtained from a regulated DC voltage power source through a resistor 19 and a zener diode 20. Numeral 22 is a select switch for changing operation mode into automatic control operation and manual operation. Numerals 23, 24 are light emitting diodes (LED) which are connected in inverse-parallel to each other, the connected diodes interposed between the two conductors a, b which are provided between the diode bridge 8 and the diodes 4, 5. Photodiodes 33, 34 are connected to the comparator 21. The photodiodes 33, 34 and the above-mentioned LEDs 23, 24 constitute a photocoupler respectively for transmitting and receiving a signal. LEDs 23, 24 are connected to current-limiting resistors 29, 30, respectively. Photodiodes 33, 34 are connected to resistors 25, 26 for pull-up.

LEDs 10, 11 are connected as indication elements to the dust detection circuit 9 through current limit resistors 27, 28 respectively. Conductors "c", "d" send a signal from the dust detection circuit 9 to the control circuit 1 of the body A of the electric vacuum cleaner.

Hereinbelow will be described operation of the above-mentioned structure. When the select switch 22 is set to the manual mode, the control circuit 1 operates so as to increase and decrease input power (suction force) of the motor blower 3 in response to operations of handle switches 6, 7 respectively. In this mode, the signal from the dust detection circuit 9 is not recognized as a control signal for the motor blower 3. Such operation is similar to that of the technique disclosed in Japanese patent application provisional publication No. 59-148594 which has been described above as a prior art.

When the select switch 22 is set to the automatic mode, the conductors a, b function as a power supply line for the dust detection circuit 9. Here, when the amount of dust is greater than a predetermined amount, the LED 10 is turned on in response to the output of the dust detection circuit 9, as well as, the signal is sent to the control circuit 1 of the body of A of the electric vacuum cleaner through conductors c, d, then, the motor blower 3 is operated with a large input power. When the amount of dust is small, the LED 11 is turned on and the motor blower 3 is operated with a small power. This operation is made in such a way as to be performed with (a) predetermined time constant (s).

When the switch 6 or switch 7 is turned on, either of LED 23 or LED 24 turns on in correspondence with the switch 6 or switch 7 because the diodes 4, 5 are connected in inverse-parallel each other as well as the LEDs 23, 24 are connected in inverse-parallel each other. Further, turning either of switch 6 or switch 7 on causes power supply applied to the diode bridge 8 to have a half-wave form. Therefore, one input voltage to the comparator 21 decreases. In this condition, another input voltage to the comparator 21, i.e., the reference voltage, is selected so as to provide a LOW output from comparator 21. On the other hand, a decrease in an output voltage of the diode bridge 8 by operation of switch 6 or 7 causes either of the photodiode 33 or photodiode 34 to turn on because the LED 23 or LED 24 turns on. This provides a signal from operation of the switch 6 or 7 which is sent to an input of the dust detection circuit 9, turning LED 10 or LED 11 on as well as setting input power of the motor blower 3 to be low or high for a predetermined interval.

Thus, a display is provided to the user which is common to the manual and automatic control operations, set by the select switch 22, in that the operation of the handle (UP-) switch 6 or hand (DOWN-) switch 7 causes LED 10 or LED 11 to turn on through the signal of the dust detection circuit 9. This means that operation of the handle switch 6 causes LED 10 for indicating high input power state to turn on and operation of the handle (DOWN-) switch 7 causes LED 11 for indicating low input power state to turn on.

INDUSTRIAL APPLICABILITY

As stated above, a useful electric vacuum cleaner is provided because there is provided the function that if the operator uses the electric vacuum cleaner where this electric vacuum cleaner would operate with a low suction force in automatic operation mode, and if the operator desires to operate the electric vacuum cleaner at a high suction force locally, the operator can operate the electric vacuum cleaner with a high suction force with a switch operation and when the operator stops switch operation, the electric vacuum cleaner returns to the original automatic operation after a predetermined time period has passed. Moreover, there is also provided the function that switch operation and automatic operation states are provided to the operator as signals for an easy determination by the operator, so that there is provided a very useful electric vacuum cleaner because when the user operates the switch to change the suction force in the incremental or decremental direction, the vacuum cleaner informs the operator by a flickering LED, in a similar manner to indicating automatic control operation state, irrespective of operation modes, i.e., in both the manual and automatic control operation modes.

We claim:
1. An electric vacuum cleaner comprising:
   (a) a housing having an electric motor means for driving a suction fan;
   (b) a suction nozzle for picking up dust;
   (c) a suction hose including a handle portion for connection said suction nozzle to said housing;
   (d) manually operable switch means provided at said handle portion of said suction hose for producing a speed command signal while said manually operable switch means is operated;
   (e) detection means for detecting an amount of said dust passing through said suction hose per unit time;
   (f) switching means responsive to said speed command signal by outputting said speed command signal when said speed command signal is present and by outputting an output signal of said detection means when said command signal is absent; and
   (g) controlling means responsive to an output signal from said switching means for controlling a speed of said suction fan driven by said electric motor means in accordance with said output signal of said detection means in the absence of said speed command signal and for setting said electric motor means to drive said suction fan at a predetermined speed in the presence of said speed command signal.

2. An electric vacuum cleaner as claimed in claim 1, further comprising another manually operable switch means provided at said handle portion for producing another speed command signal, and wherein said controlling means comprises first means for setting said electric motor means to drive said suction fan at a first, high, speed in presence of said speed command signal and second means for setting said electric motor means to drive said suction fan at a second, low, speed, lower than said first speed, in the presence of said another speed command signal.

3. An electric vacuum cleaner as claimed in claim 2, further comprising indicating means responsive to said output of said switching means for indicating a condition of said output signal of said switching means thereby indicating operation of said manually operable switch means.

4. An electric vacuum cleaner as claimed in claim 3, wherein said indicating means comprises first indicating means responsive to said speed command signal for indicating operation of said operable switch means and second indicating means responsive to said another speed command signal for indicating operation of said another means operable switch means.

5. An electric vacuum cleaner as claimed in claim 4, wherein said detection means outputs first and second detection signals in response to low and high quantities of dust passing through said suction hose per time unit and wherein said first and second indicating means are also respectively responsive to said first and second detection signals for indicating, in an automatic mode of operation, said low and high quantities of dust passing through said suction hose per unit time.

6. An electric vacuum cleaner as claimed in claim 5, wherein said first and second indicating means comprise respective first and second LED.

7. An electric vacuum cleaner as claimed in claim 5, wherein said controlling means includes:
    manually operated mode setting means for setting operation of said vacuum cleaner to one of a manual mode of operation and said automatic mode of operation; and
    means responsive to said first and second detection signals in said automatic mode of operation for setting said motor means to drive said suction fan at different speeds when different quantities of dust pass through said suction hose per unit time.

8. An electric vacuum cleaner as claimed in claim 5, wherein said manually operated switch means and said another manually operated switch means respectively comprise first and second momentary switch means for producing said speed command signal temporarily, only while one of said manual operable switch means is being operated.

9. An electric vacuum cleaner as claimed in claim 3, wherein said manually operated switch means and said another manually operated switch means respectively comprise first and second momentary switch means for producing said speed command signal temporarily, only while one of said manual operable switch means is being operated.

10. An electric vacuum cleaner as claimed in claim 2, wherein said manually operated switch means and said another manually operated switch means respectively comprise first and second momentary switch means for producing said speed command signal temporarily, only while one of said manual operable switch means is being operated.

11. An electric vacuum cleaner as claimed in claim 1, further comprising indicating means responsive to said manually operable switch means in a manual mode of operation for indicating driving of said suction fan at said predetermined speed and responsive to said detection means in an automatic mode of operation for indicating driving of said suction fan at a speed corresponding to the detected amount of dust passing through said suction hose per unit time.

12. An electric vacuum cleaner as claimed in claim 11, wherein said manually operable switch means comprises momentary switch means for producing said speed command signal temporarily, only while said manually operable switch means is being operated.

13. An electric vacuum cleaner as claimed in claim 1, wherein said manually operable switch means comprises momentary switch means for producing said speed command signal temporarily, only while said manually operable switch means is being operated.

14. An electric vacuum cleaner as claimed in claim 1, wherein said controlling means controls said speed of said suction fan by providing different input power levels to said electric motor means.

* * * * *